United States Patent [19]

Engel et al.

[11] 3,824,472

[45] July 16, 1974

[54] PORTABLE RADIO/TAPE RECORDER CHARGING AND LOCKING SYSTEM

[76] Inventors: F. William Engel, 1418 Third Ave., San Mateo, Calif. 94402; Robert S. Engel, 2365 N. Edgewood St., Arlington, Va. 22207; Gerald J. Derbes, c/o General Delivery, Kings Hill, Saint Croix; M. Walter Dusseau, 38 Strand St., Christiansted, Saint Croix, both of V.I. 00820

[22] Filed: Jan. 24, 1973

[21] Appl. No.: 326,210

[52] U.S. Cl. ..... 325/355, 179/100.2 Z, 317/101 CB, 325/311

[51] Int. Cl. ............................................ A47b 81/06

[58] Field of Search ........... 325/310, 311, 352, 492, 325/494; 179/100.2 Z, 100.12 A; 320/3, 4, 28, 29; 312/7 R; 317/101 R, 101 CB; 274/2; 70/58

[56] References Cited

UNITED STATES PATENTS

| | | | |
|---|---|---|---|
| 2,866,891 | 12/1958 | Prine | 325/310 |
| 3,041,521 | 6/1962 | Ragosch et al. | 320/29 X |
| 3,070,748 | 12/1962 | Worobey et al. | 320/4 X |
| 3,521,010 | 7/1970 | Sato | 179/100.2 Z |
| 3,560,666 | 2/1971 | Bookman | 179/100.2 Z |
| 3,611,151 | 10/1971 | Fernandez | 325/311 X |

*Primary Examiner*—Benedict V. Safourek

[57] ABSTRACT

Radio/tape recorders, particularly a charging base and a locking system for locking the portable radio/tape recorder when not in use. The system is particularly adaptable to hotel use, enabling the rental and removal of the radio/tape recorder by the individual guest and use of the unit as a business or recreational aid apart from the hotel room.

3 Claims, 2 Drawing Figures

PORTABLE RADIO/TAPE RECORDER CHARGING AND LOCKING SYSTEM

BACKGROUND OF THE INVENTION

1. Field of the Invention

Radio/tape recorders, particularly devices for charging such portable units and securely locking said units during charging.

Earlier inventors have approached the problem of locking a radio or tape recorder-player unit in place and, also, of providing a wall mount for charging a portable radio. However, none have approached the concept of providing a base unit which could effectively lock the portable radio/tape recorder in place for battery charging and when not in use. Nor, have earlier inventors applied themselves to the problem of devising a unit suitable for selective rental and removal from the hotel room at the option of the hotel guests.

2. Description of the Prior Art

Prior art searching has developed the following:

| | |
|---|---|
| DALTON | 3,644,873 |
| ROBERTSON et al. | 3,553,585 |
| ALLEY | 3,615,031 |
| SCHWARZ | 2,662,975 |

Schwarz, assigned to General Motors, and Alley address themselves to locking of a radio receiver or tape recorder within an automobile, using a special key. Note that Schwarz contemplates removal of the radio for portable use. Alley provides his hasp lock which is attached to the steering column by means of a cable or the like and engaging the mounting and bracket for his tape recorder. Robertson, assigned to Motorola, locks and mounts his communications equipment within the trunk of an automobile. Dalton, assigned to General Electric Co., mounts his portable, battery operated radio in a wall receptacle for charging. However, Dalton does not lock his unit within the charging receptacle. However, he does suggest the use of a pin means for activating the charging system.

SUMMARY OF THE INVENTION

According to the present invention a portable radio/-tape recorder is provided with a charging and locking system, the combination including a base unit having a charger with an on/off switch and a charging outlet and an electrical circuit interconnecting the charger and a source of electrical power. The portable radio/tape recorder unit is removably positioned in the base unit and includes an energizing circuit engageable with the charger outlet, tape recorder/player and radio components operably supported in the energizing circuit and lock means supported in the housing so as to lock said unit to the base during charging and when not removed for portable use.

DESCRIPTION OF THE PREFERRED EMBODIMENTS

Figure 1:
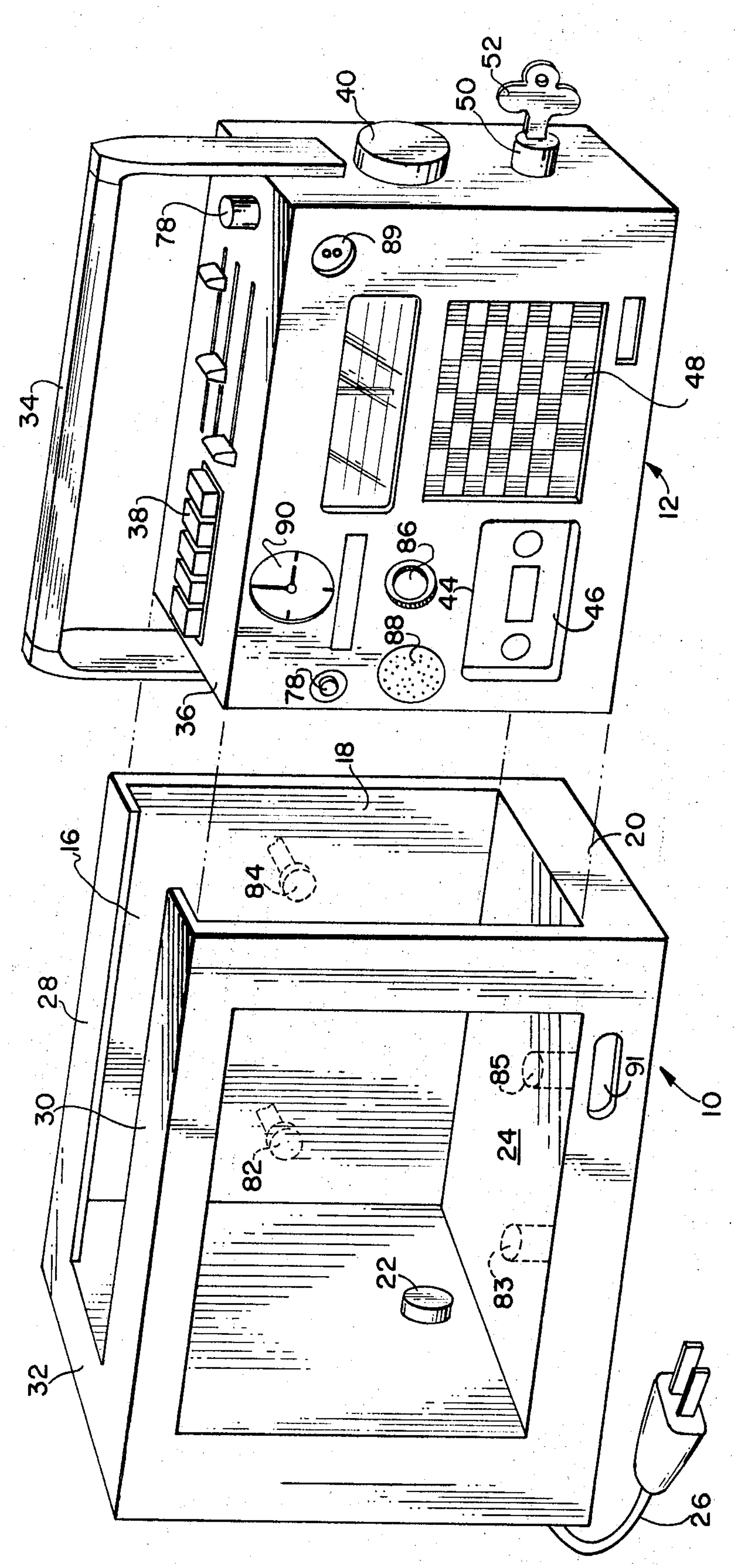
FIG. 1 is an exploded view showing the radio/tape recorder-player removed from the base unit charger for portable use.

In FIG. 1 there are illustrated base charging unit 10 and radio/tape recorder-player unit 12, removed therefrom for portable use.

The base charging unit includes a rectangular frame defining a flat, lower support surface 24 and a rectangular, receiving concavity 18. The sides of the frame extend into horizontal flanges 28, 30 and 32, which enclose the top surface of the radio/tape recorder-player. Frame 10 includes an outlet connector 22 extending into concavity 18 so as to be engageable with a corresponding connector piece 62 in the radio/tape recorder-player circuit. Connector piece 62 may be coded by any conventional means such that the unit may be charged only when abutting connector 20. A conventional outlet plug 26 or other electrical power source may be connected to the charger circuit illustrated in FIG. 2.

The radio/tape recorder-player unit 12 includes a conventional housing having a tape recorder recess 44 operably supporting a cassette 46 which may be removably positioned on driving spindles, not particularly illustrated. The unit includes a top surface 36 over which a handle-antenna 34 may be pivoted and upon which a band control, volume switches and the like 38 may be supported, as well as on/off switch 78. A tuning knob 40 may be positioned at one end as is locking tumbler 50 with removable key 52. The circuit may include optional components such as cigarette lighter 86, paging microphone 88 and clock 90. In larger units a television tube (not illustrated) could also be provided. The unit could be externally sealed so as to be waterproof. Also, the unit could be externally locked to prevent unauthorized tampering or servicing of the energizing circuit and operational components.

Figure 2:
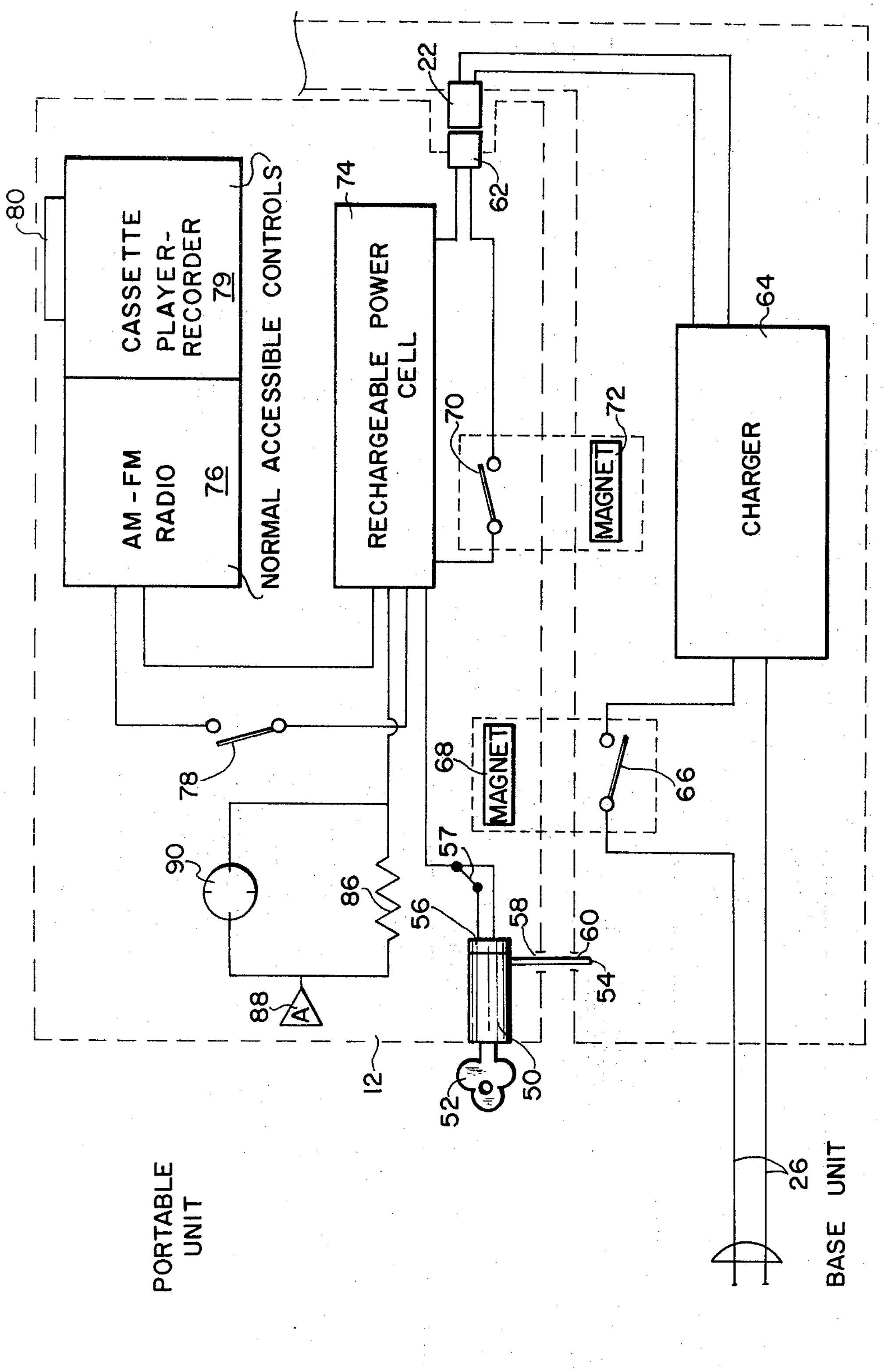
FIG. 2 is a circuit diagram showing removably interconnected circuits for the charger and radio/tape recorder-player unit.

In FIG. 2 the system is more particularly illustrated, the base unit charger 64 including on/off switch 66, activated as a relay by corresponding magnet 68 positioned in the bottom of the radio/tape recorder-player. The charging outlet 22 is engageable with a corresponding outlet 62 in the energizing circuit of the radio/tape recorder-player, which unit includes a rechargeable power cell activated by switch 70, in turn controlled as a relay by magnet 72 supported in the base unit. Conventional radio cassette playing-recording element 79 and a radio 76 with speaker 48 may be supported in the circuit, the cassette having an input mike 80. The "erase" function of the tape recorder would be eliminated, so as to avoid inadvertent destruction of rented tapes.

The locking tumbler 50 may be employed to unlock the unit for operation so that it may be physically released. Charging, or course, will only occur when the unit is locked in place within the base. The circuit may include a locking tumbler master switch 57 which permits the radio/tape recorder-player to be activated as the tumbler is rotated to unlocked position by key 52. The key lock insures against tampering or theft of the unit in the hotel room and responsibility for theft of the unit would become that of the guest after the unit is removed from the wall unit. Suitable bolts 82, 84, 83, 85 or the like, shown in phantom, may be used to secure the base unit to a wall, cabinet or the like in the hotel room.

Hotel guests by renting a key from the front desk may unlock the unit for portable use throughout the hotel, in a rental car, during the course of a business day, on the beach, golf course, swimming pool or the like. Business correspondence may be dictated in the recorder, then posted by mail. Also, the hotel could supply complimentary tapes of entertainment or educational value for individual use by the hotel guests. Advertising, of course, could be provided on such tape media.

Manifestly, various types of locks and radio/tape recorder combinations can be employed without departing from the spirit of invention as defined in the attached claims. Also, dual purpose socket element 86 may be provided in the portable unit for use of an electric toothbrush or other electrically operated device and in the base unit outlet 88 may be provided for charging of an electric razor or the like.

We claim:

1. A rechargeable and portable radio/tape recorder charging and locking system, comprising:

A. a base unit including:
   i. a charger having an on/off switch and a charging outlet connector;
   ii. an electrical circuit interconnecting said charger and a source of electrical power;

B. a portable radio/tape recorder unit removably positioned in said base unit and including:
   i. an energizing circuit engageable with said charger outlet connector;
   ii. tape recorder and radio components operably supported in said circuit, said tape recorder including a mike means and amplifier, so as to enable tape recording, as well as playback within said unit; and
   iii. lock means supported in said radio/tape recorder unit and extensible into said base, including a tumbler, activated by a key and a bar pivotable so as to lock said unit to said base when not in use from said tumbler through the tape recorder housing and into said base;

C. a rechargeable power cell mounted in said energizing circuit and including an on/off switch and said base unit including magnetic means positionable adjacent said on/off switch, so as to deactivate said rechargeable power cell, as said radio/tape recorder is removed from said base; and D. a cigarette lighter connected to said energizing circuit and supported in said radio/tape recorder unit.

2. A rechargeable and portable radio/tape recorder charging and locking system as in claim 1, said radio/-tape recorder including a page amplifier system, so as to enable remote paging through the radio speaker.

3. A rechargeable and portable radio/tape recorder charging and locking system as in claim 1, including a clock connected to said energizing circuit.

* * * * *